| United States Patent [19] | [11] Patent Number: 4,565,535 |
|---|---|
| Tassy | [45] Date of Patent: Jan. 21, 1986 |

[54] LIFE PRESERVER DEVICE

[76] Inventor: Tomas Tassy, 8101 Langdon Ave., #57, Van Nuys, Calif. 91406

[21] Appl. No.: 632,049

[22] Filed: Jul. 18, 1984

[51] Int. Cl.⁴ .............................................. B64D 25/02
[52] U.S. Cl. .................................... 441/118; 280/728; 280/743; 244/121
[58] Field of Search ...................... 441/92, 80, 83, 106, 441/118, 119, 117, 123, 125, 129, 131, 132; 280/728, 730, 732, 733, 743; 2/2; 244/121, 118.5, 122 AG

[56] References Cited

U.S. PATENT DOCUMENTS

| 3,243,822 | 4/1966 | Lipkin | 2/2 |
|---|---|---|---|
| 3,345,657 | 10/1967 | Peeler | 441/92 |
| 3,603,535 | 9/1971 | Depolo | 244/121 |
| 3,632,132 | 1/1972 | Richardson | 280/728 |
| 3,748,477 | 7/1973 | Wulbrecht | 280/743 |
| 3,779,577 | 12/1973 | Wilfert | 280/730 |
| 3,803,652 | 4/1974 | Uyehara | 441/123 |
| 3,827,716 | 8/1974 | Vaughn | 280/730 |
| 3,985,374 | 10/1976 | Powaska | 280/730 |
| 3,988,795 | 11/1976 | Robertson | 441/118 |

Primary Examiner—Trygve M. Blix
Assistant Examiner—C. T. Bartz
Attorney, Agent, or Firm—John J. Posta, Jr.

[57] ABSTRACT

The improved device includes a hollow container with latched door, inside of which is coiled an inflatable, body contoured gas bag releasably connected to the container and gravity deployable through the door. The device includes valves, conduits and the like to automatically or manually inflate and deflate the bag. The container is adapted to fit into the back of an airliner seat and when in that position and inflated acts as an effective crash barrier for a passenger sitting behind the bag. A strap or the like is also provided for releasably securing the bag to a person as a flotation device when the need arises. Therefore, the bag serves a dual function. The bag, when inflated, includes an upper horizontal portion with head-receiving opening and a vertical lower portion with end panel sides adapted to receive a passengers upper torso. The bag can include two sections releasably secured front to back, both of which act as the crash barrier and one of which acts as an individual flotation device. The device is simple and effective.

19 Claims, 7 Drawing Figures

LIFE PRESERVER DEVICE

BACKGROUND OF THE INVENTION

1. Field of the Invention

The present invention generally relates to safety devices and, more particularly, to an improved combination device which acts as an inflatable personal vehicle crash barrier and water flotation life preserver.

2. Prior Art

Inflatable, globular, pillow-like air bags have been used in motor cars, trucks and similar land vehicles as personal crash barriers to preserve a person sitting behind the bag in the event of a crash. Such bags automatically inflate during the crash. They are permanently connected to their containers for reuse after the crash. See, for example, U.S. Pat. Nos. 3,779,577 and 3,748,477. Such devices have not been employed in airplanes, helicopters and the like air vehicles, even though many air passengers are injured each year because of rough weather flights and bumpy landings. Instead, airplanes do provide cushions which float, in case of a ditching at sea, see U.S. Pat. No. 3,762,766, or conventional Mae West type flotation preservers (See U.S. Pat. No. 3,345,657), and inflatable emergency slides and rafts (See U.S. Pat. No. 3,679,025).

Recently, various improvements have been made in plane safety devices. Thus, U.S. Pat. No. 3,603,535 is directed to inflatable airplane crash means in the form of flat inflatable panels positioned on the seats, bulkheads and plane baggage rocks, but of little use as a flotation device, while U.S. Pat. No. 3,243,822 is directed to an inflatable jacket to be worne by a plane passenger and inflated before and during a collision. That device has not received any acceptance due to its bulk, inconvenience and suggestion of danger.

More exotic personal protection devices are described in U.S. Pat. Nos. 3,895,396, 3,105,981 and 462,291, all of which must be worne before use, like the jacket of U.S. Pat. No. 3,243,822.

Accordingly, there remains a need for an improved inflatable personal safety device which will protect air passengers and the like both from the shock of crashes and the jolting during a rough weather flight, but also will be useful as a water flotation device in case of a ditching at sea. Such device should be small, unobtrusive, easily inflated, deflated and reusable, and should not require wearing by the passenger before use.

SUMMARY OF THE INVENTION

The improved life preserver device of the present invention satisfies all the foregoing needs. The device is substantially as set forth in the Abstract above. Thus, it comprises a small portable container with an openable lid. The container is adapted to fit into, for example, the rear of a plane passenger seat and stores a folded, deflated, body contoured gas bag which is gravity deployable from the container through the lid and which can be separated from the container for use as a personal water flotation device when needed.

The device includes means to inflate and deflate the gas bag. The bag when inflated preferably comprises an upper horizontal portion defining a head hole and adapted to be worne around the neck and a lower vertical portion, including a thickened end panel and spaced sides. The lower portion is adapted to receive the chest and waist of a passenger. A strap and hook or the like may be secured to the lower portion to releasably hold it in place around the passenger.

The inflated bag can, if desired, include two sections releasably disposed front to back, the first of which sections includes the horizontal upper portion and chest girdling lower portion and the second of which sections augments the thickness of the crash panel to increase the crash resisting nature of the device. That second section may be permanently attached to the container, which the first section is releasably connected thereto and/or to the container. Suitable disconnectable air conduits bridge the two sections.

The device can include manually inflatable air chambers and/or gas cylinders for selective and/or automatic inflation of the gas bag upon deployment from the container.

The device when inflated firmly wedges an air plane passenger or the like in that passenger's seat behind the seat bearing the container, to prevent the passenger from being thrown out of the seat and/or against the plane window, floor, etc. In a preferred embodiment, when there is need of a flotation preserver, the passenger strips the inflated bag or preserver portion thereof from the container and reverses its direction, dons it and straps it in place, all very rapidly and conveniently. The device is inexpensive, compact, convenient, has a dual function of providing a personal crash barrier and also acting as an individual flotation device, and is reusable. When not in use it is out of sight in the container. Other details are set forth in the following specific description and accompanying drawings.

DRAWINGS

DETAILED DESCRIPTION

FIGS. 1-5

Figure 1:
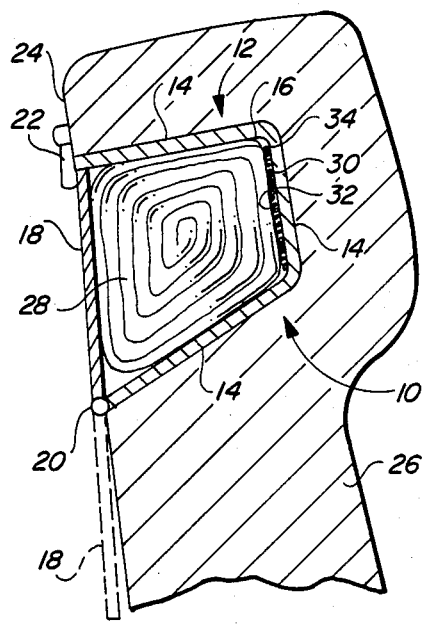
FIG. 1 is an enlarged, fragmentary side elevation, partly in section, of a first preferred embodiment of the improved life preserver device of the present invention mounted in the back of an airplane passenger seat, shown with the air bag in the deflated coiled stored position.

Now referring more particularly to FIGS. 1-5, a first preferred embodiment of the improved life preserver device of the present invention is schematically depicted therein. Thus, device 10 is shown, which comprises a container 12 of metal, wood, ceramic, glass, plastic or the like having spaced walls 14 defining a hollow interior storage space 16, with a front lid 18 hinged at point 20 to a wall 14 and releasably secured in the closed position shown in FIG. 1 by a turnable latch 22 secured to the rear face 24 of an air passenger seat 26. Container 12 is disposed in seat 26 such that when latch 22 is turned to permit lid 18 to drop to the position in dotted outline, an inflatable, flexible gas bag 28 coiled in space 16 deploys by gravity out of container, with the inner end 30 thereof releasably secured to an inner rear surface 32 of a wall 14, as by velcro-type mating strips 34 connected to end 30 and surface 32.

Figure 3:
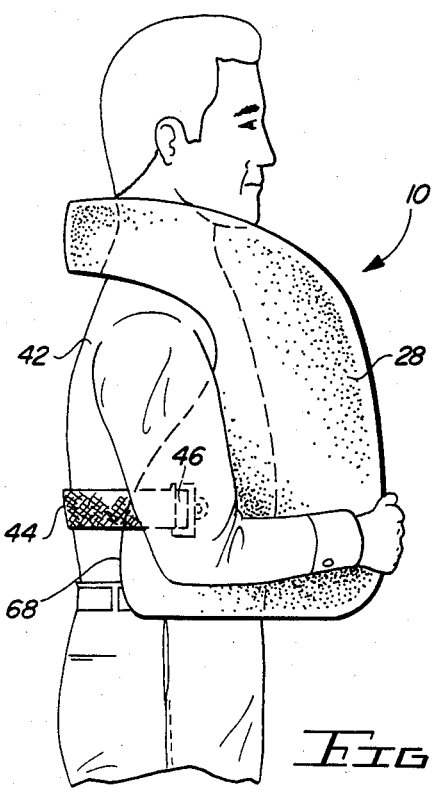
FIG. 3 is a schematic side elevation of the inflated bag of the device of FIG. 2 releasably secured around a standing passenger, for use as a personal water flotation device.
Figure 2:
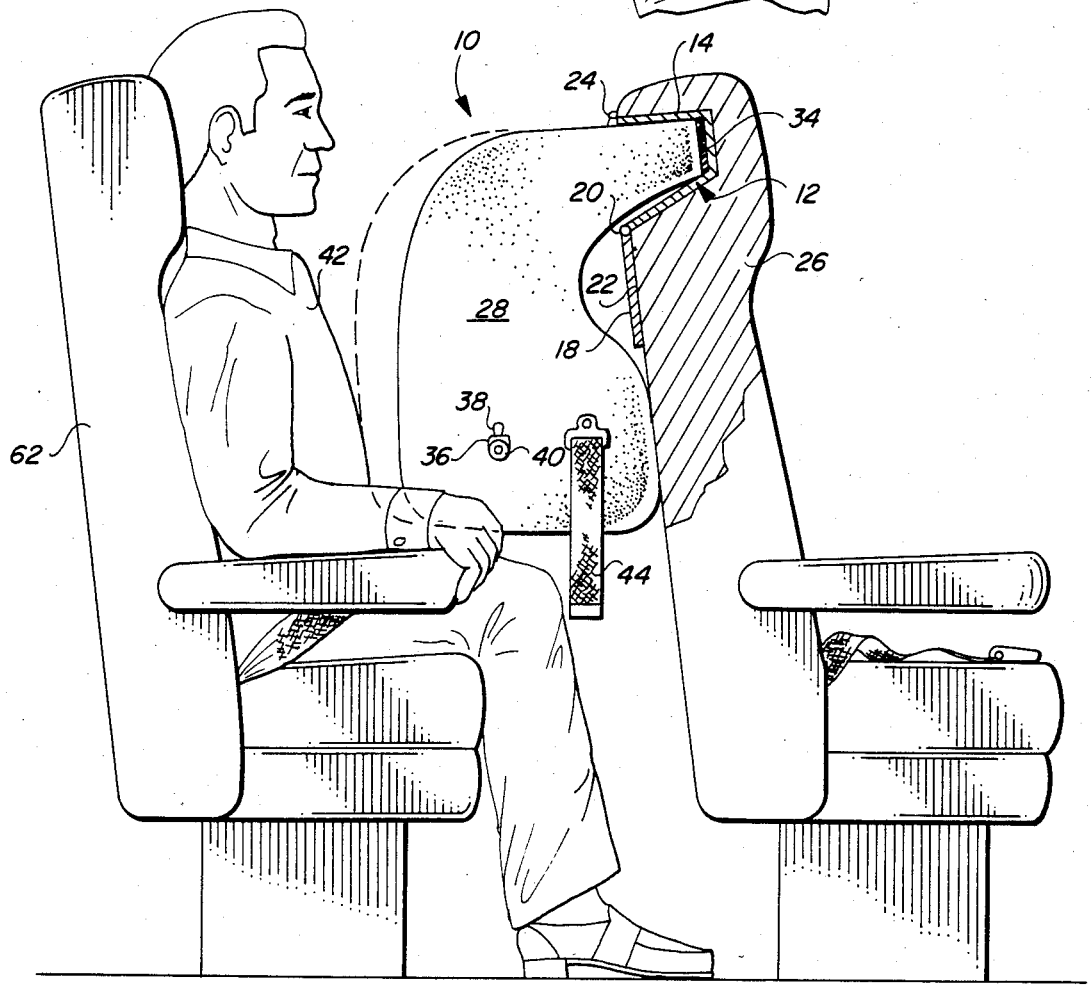
FIG. 2 is a schematic side elevation of the device of FIG. 1, shown with the air bag thereof deployed and largely expanded to act as a crash barrier and flotation device.
Figure 4:
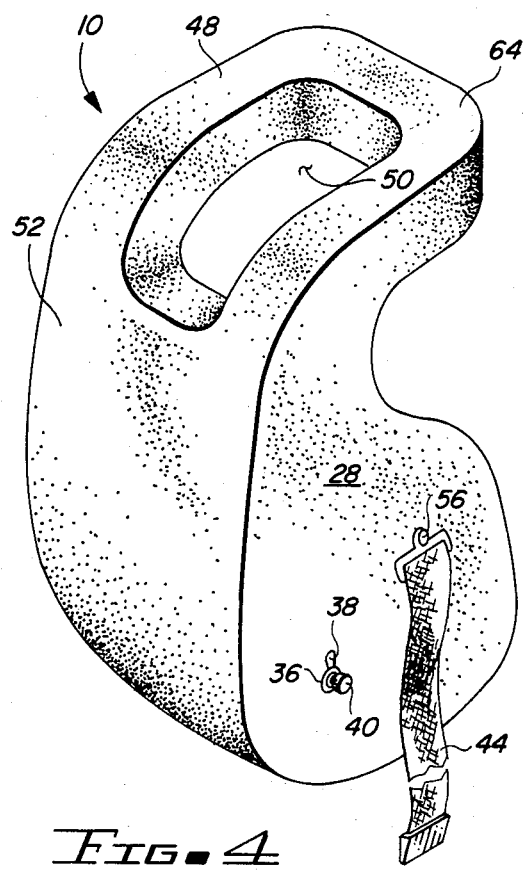
FIG. 4 is an enlarged schematic perspective view of the inflated bag of FIG. 2.
Figure 5:
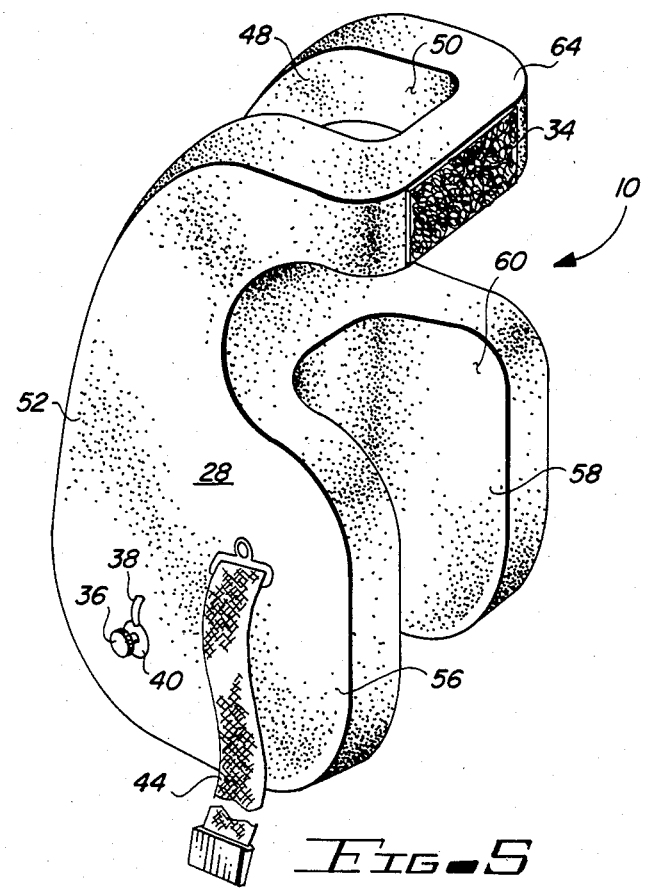
FIG. 5 is a second enlarged, schematic perspective view of the inflated bag of FIG. 2.

Bag 28 can be made of rubber, rubberized or plasticized cloth, plastic or the like so as to be light and readily inflatable, in this instance by means of a one-way valve 36 connected by a tube 38 or the like to the interior of bag 28. Valve 36 includes an air release turn cock 40 with which to deflate bag 28 after use. Bag 28 further includes means for releasably securing it about a plane passenger 42 (FIGS. 2 and 3). Such means may comprise a flexible strap 44 on one side of bag 28 and adapted to be releasably secured to a small slip buckle 46 or velcro-type strip on the opposite side of bag 28 (FIG. 3).

In the inflated condition, bag 28 preferably has an upper, about horizontal neck-girdling collar portion 48 (FIGS. 3, 4 and 5) defining a central head-receiving opening 50. Portion 48 is connected to a lower generally vertical portion 52 comprising an end crash panel 54 connected to a pair of spaced sides 56 and 58 defining a chest-receiving pocket 60.

It will be noted, by comparing FIGS. 2 and 3, that when bag 28 is inflated, it provides passenger 42 with an effective crash barrier to prevent him from plunging into seat 26 ahead of him during rough weather or on impact of the plane with the ground or sea during landing. If desired, bag 28 can be inflated fully enough (to the dotted outline position) to sandwich passenger 42 back fully and tightly in his own seat for better protection.

In the embodiment of FIGS. 1-5, end 64 of collar 48 extends into container 12 and bears strip 34. When it is desired to don inflated bag 28 as a flotation preserver, as shown in FIG. 3, bag 28 before or after inflation is stripped from container 12 and after full inflation is reversed in direction so that the free ends 66 and 68 of sides 56 and 58, respectively, extends rearwardly, rather than forwardly as shown in FIG. 2 where inflated bag 28 is serving as a crash barrier.

It will be understood that sides 56 and 58 and panel 54 have the advantageous effect of spacing passenger 42 well away from rear face 24 of seat 26 to in effect increase the crash barrier efficiency of bag 28. Moreover, they cooperate to provide protective flotation pocket 60 when bag 28 is used as a flotation preserver.

Thus, device 10 is dual in nature and function, inexpensive, durable, easily stored out of sight, and thus unobtrusive, rapidly activated and deactivated and fully reusable. It will be understood container 12 could be placed in an overhead receptable, or compartment, in which event bag 28 would require a different more elongated shape to depend into operative position. Alternatively, it could be placed in a front plane compartment wall or car dashboard, etc.

FIG. 6

Figure 6:
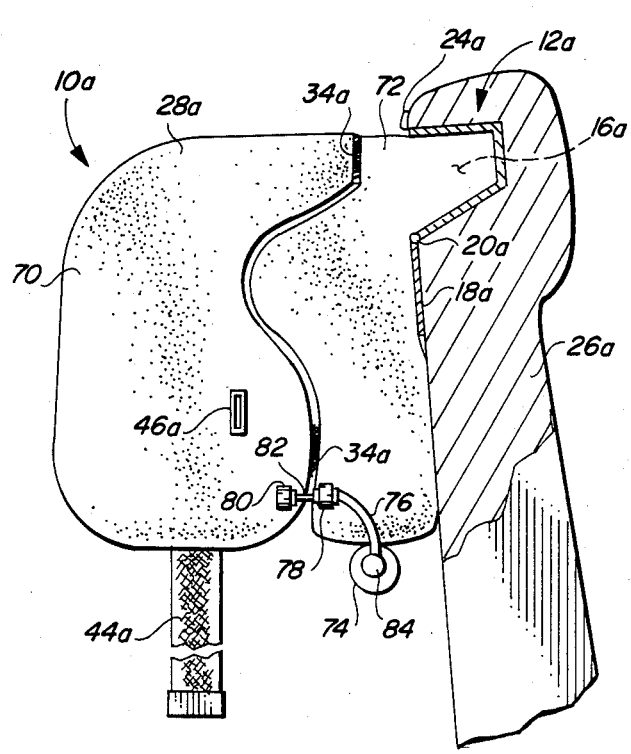
FIG. 6 is a schematic side elevation, partly in section, of a second preferred embodiment of the improved life preserver device of the present invention, shown with two inflated sections.

A second preferred embodiment of the improved life preserver device of the present invention is schematically depicted in FIG. 6. Thus, device 10a is shown. Components thereof similar to those of device 10 of FIGS. 1-5 bear the same numerals, but are succeeded by the letter "a".

Device 10a includes container 12a (shown disposed in the rear face 24a of a plane passenger seat 26a) with a hinged openable lid 18a and a storage space 16a having a bag 28a extending outwardly rearwardly therefrom. Bag 28a comprises a first rear section 70 having upper horizontal collar 48a and lower portion 52a, releasably connected, as by spaced velcro-type strips 34a, to a second front section 72, in turn which may be releasably or permanently fixed to container 12a.

Device 10a also includes a compressed gas cylinder 74 secured to bag 28a and connected by tubing 76 and valves 78 and 80 to the interior of sections 70 and 72. Tubing 82 releasably spans valves 78 and 80. Thus, when cylinder 74 is turned on via handle 84, sections 70 and 72 are filled to the shape shown in FIG. 6. Sections 70 and 72 cooperate as a personal crash barrier. When it is desired to use section 70 as a water flotation preserver, it is stripped from section 72 at strips 34a, tubing 82 thereupon separating from valve 78. Both valves 78 and 80 are one-way valves with auxiliary bleed-off lines (not shown). Section 70 can be rejoined to section 72 by reversing the described procedure, then can be deflated and stored with section 72 in container 12a after use. Section 70 can be turned in direction and releasably strapped on via strap 44a and buckle 46a for flotation purposes. Device 10a is light, effective and multi-purpose.

FIG. 7

Figure 7:
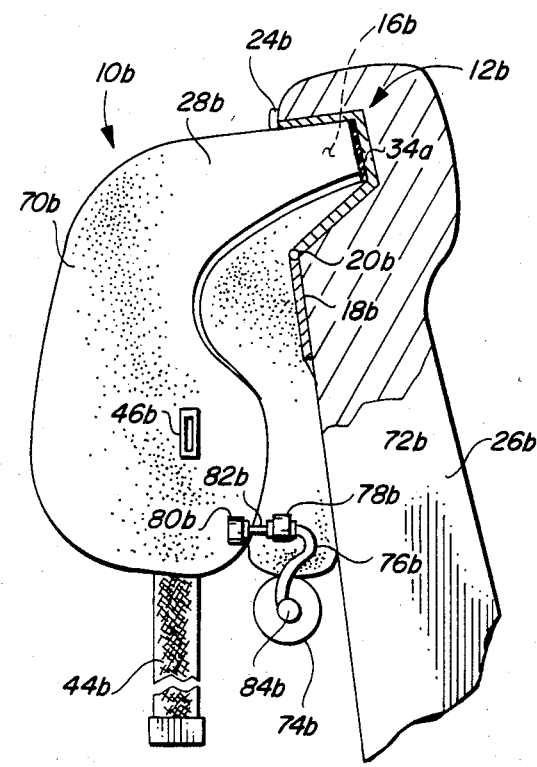
FIG. 7 is a schematic side elevation, partly in section, of a third preferred embodiment of the improved life preserver device of the present invention, shown with two inflated sections.

A third preferred embodiment of the improved life preserver device of the present invention is schematically depicted in FIG. 7. Thus, device 10b is shown. Components thereof similar to those of device 10 and/or device 10a bear the same numerals, but succeeded by the letter "b". Device 10b differs from device 10a only in the single respect that section 70b is releasably connected only to container 12b through strips 34b and not to section 72b, while section 72b is permanently secured to container 12b. Cylinder 74b with turn cock 84b, tubing 76b and 82b and valves 78b and 80b are also provided, as are strap 44b and buckle 46b. Container 12b is secured to rear face 24b of seat 26b and device 10b functions similarly to device 10a. When bag 28b is inflated, section 70b is used as a flotation preserver, while sections 70b and 72b cooperate as a crash barrier.

It will be understood that cylinder 74b could, with appropriate fittings, (not shown) be made to automatically fill sections 70b and 72b upon deployment of bag 28b from container 12b. Moreover, sections 70b and 72b could be of somewhat different configurations than those shown.

Various other modifications, changes, alterations and additions could be made in the improved life preserver of the present invention, its components and parameters. All such modifications, changes, alterations and additions as are within the scope of the appended claims form part of the present invention.

What is claimed is:

1. An improved life preserver device, said device comprising, in combination:
   (a) a chair having an upwardly extending back portion;
   (b) said back portion including a container having a central storage space and an openable lid covering an opening in said container providing access to said space;

(c) an inflatable, body contoured gas bag folded in said storage space and deployable through said opening when said lid is opened;

(d) connector means for releasably securing said gas bag to said back portion, said bag when inflated having;

(i) an upper portion defining an opening adapted to receive a human head;

(ii) and a lower contoured portion connected to said upper portion and including a thickened end wall and spaced sides adapted to abut and receive the front and sides of a person for water flotation purposes, after disconnecting said bag from said back portion, said bag, when secured to said back portion in a vehicle and inflated, then serving as a crash barrier;

(e) whereby release of said interconnection means enables a person to use said gas bag as a flotation preserver; and (f) means for selectively inflating and deflating said bag.

2. The improved device of claim 1 wherein said gas bag when inflated and still connected to said back portion faces in a first direction and acts as a crash barrier and wherein said inflated bag when disconnected from said back portion is reversible for donning by a person for use as a water flotation life preserver.

3. The improved device of claim 2 wherein said device includes a gas pressure source and gas presssure relief means connected to said bag and wherein said means for releasably securing said inflated bag to a person as a life preserver comprises at least one strap and releasable strap-anchoring means.

4. The improved device of claim 3 wherein said bag when deflated is coiled in said storage space and is deployable therefrom by gravity, and wherein said container is adapted to be secured in the back of a vehicle seat with said lid facing rearwardly, for access by a passenger behind said seat.

5. The improved device of claim 4 wherein said upper portions of said inflated bag is horizontal and wherein said lower portion of said inflated bag is generally vertical.

6. An improved life preserver device, said device comprising, in combination:

(a) a container having a central storage space and an openable lid covering an opening in said container providing access to said space;

(b) an inflatable, body contoured gas bag releasably connected by connector means to the interior of said container, folded in said storage space and deployable through said opening when said lid is opened, said bag when inflated having;

(i) an upper portion defining an opening adapted to receive a human head;

(ii) and a lower contoured portion connected to said upper portion and including a thickened end wall and spaced sides adapted to abut and receive the front and sides of a person for water flotation purposes, said bag, when maintained by said container in a vehicle and inflated, also serving as a crash barrier;

(c) means connected to said bag for releasably securing said bag, when inflated, to a person as a flotation preserver; and (d) means for inflating and deflating said bag, (e) wherein said gas bag when inflated and still connected to said container faces in a first direction and acts as a crash barrier and wherein said inflated bag when disconnected from said container is reversible for donning by a person for use as a water flotation life preserver, (f) wherein said device includes a gas pressure source and gas pressure relief means connected to said bag and wherein said means for releasably securing said inflated bag to a person as a life preserver comprises at least one strap and releasable strap-anchoring means, (g) wherein said bag when deflated is coiled in said storage space and is deployable therefrom by gravity, and wherein said container is adapted to be secured in the back of a vehicle seat with said lid facing rearwardly, for access by a passenger behind said seat, (h) wherein said upper portions of said inflated bag is horizontal and wherein said lower portion of said inflated bag is generally vertical, (i) wherein said bag includes two contoured mating sections readily separable from each other when said bag is inflated, said sections being disposed in generally abutting front-to-rear alignment, the first of said sections having said upper and lower portions and useable as a water flotation life preserver, as well as crash barrier, the second of said section cooperating with said first section to act as a crash barrier.

7. The improved device of claim 6 wherein said sections include releasably connected gas conduits for inflation and deflation thereof.

8. The improved device of claim 7 wherein said second section is fixedly connected to said container interior.

9. The improved device of claim 8 wherein said first section is releasably connected by said connector means to the interior of said container.

10. The improved device of claim 9 wherein said connector means comprises mating velcro-type strips secured to said bag and the interior of said container.

11. The improved device of claim 9 wherein said upper horizontal portion of said bag first section is releasably connected to said container interior.

12. An improved life preserver device adapted for use on an aircraft, said device comprising:

(a) a shock absorbing member adapted to be interposed between a passenger and the back of a chair diposed in front of the passenger to brake forward movement of the person's body during a crash of the airplane;

(b) releasable interconnection means securing said shock absorbing member to said chair, (c) said shock absorbing member having an opening therein adapted to receive a human head and further having a portion thereof contoured to receive a portion of a human body, and (d) means associated with said member to attach said member to the passenger so as to act as a life preserver when said interconnection means are released.

13. The improved device of claim 12 wherein said member is an inflatable body.

14. The improved device of claim 12 wherein a storage space is provided in said back to store said member.

15. The improved device of claim 13 wherein a gas pressure source is provided to inflate said member.

16. The improved device of claim 16 wherein gas pressure relief means is connected to said gas pressure source.

17. The improved device of claim 14 wherein said member is coiled in said storage space when not in use and is deployable therefrom by gravity when in use.

18. An improved life preserver device, said device comprising, in combination:
  (a) a chair having an upwardly extending back portion;
  (b) said back portion including a container having a central storage space and an openable lid covering an opening in said container providing access to said space;
  (c) an inflatable, body contoured gas bag folded in said storage space and deployable through said opening when said lid is opened,
  (d) connection means for releasably securing said gas bag to said back portion, said bag when inflated having;
    (i) an upper portion defining an opening adapted to receive a human head;
    (ii) and a lower contoured portion connected to said upper portion and including a thickened end wall and spaced sides adapted to abut and receive the front and sides of a person for water flotation purposes, after disconnecting said bag from said back portion said bag, when secured to said back portion in a vehicle and inflated, then serving as a crash barrier;
  (e) whereby release of said interconnection means enables a person to use said gas bag as a flotation preserver; and
  (f) means for selectively inflating and deflating said bag,
  (g) wherein said bag includes two contoured mating sections readily separable from each other when said bag is inflated, said sections being disposed in generally abutting front-to-rear alignment, the first of said sections having said upper and lower portions and useable as a water flotation life preserver, as well as crash barrier, the second of said section cooperating with said first section to act as a crash barrier.

19. The improved device of claim 18 wherein said second section is fixedly connected to said back portion and said first section is releasably connected to said back portion.

* * * * *